United States Patent
Lee

Patent Number: 5,109,627
Date of Patent: May 5, 1992

[54] ANIMAL TRAP

[76] Inventor: Donald R. Lee, Box 588, Sundance, Wyo. 82729

[21] Appl. No.: 722,510

[22] Filed: Jun. 27, 1991

[51] Int. Cl.⁵ .................. A01M 23/26; A01M 23/34
[52] U.S. Cl. ......................................... 43/88; 43/87
[58] Field of Search .................. 43/88, 87 X, 86, 85

[56] References Cited

U.S. PATENT DOCUMENTS

| 2,146,019 | 2/1939 | Knippelmeir | 43/87 |
| 2,178,256 | 10/1939 | Graybill | 43/87 |
| 4,389,807 | 6/1983 | Novak | 43/87 |

FOREIGN PATENT DOCUMENTS 444596  3/1936  United Kingdom .................. 43/87

Primary Examiner—Richard K. Seidel
Assistant Examiner—Chuck Y. Mah
Attorney, Agent, or Firm—Barnes, Kisselle, Raisch, Choate, Whittemore & Hulbert

[57] ABSTRACT

An animal trap having a pair of arcuate arms connected by a flexible cable. In the set condition of the trap, the arms are spread apart. When an animal steps on a trigger in the space between the spread apart arms, the trap is sprung and the arms are moved together by a swinging frame. A clamping plate on the swinging frame cooperates with the cable in gripping the foot or leg of the animal. The clamping plate is a broad-faced member provided with a concave central section which closes gently on the limb of the animal without causing unnecessary injury.

10 Claims, 1 Drawing Sheet

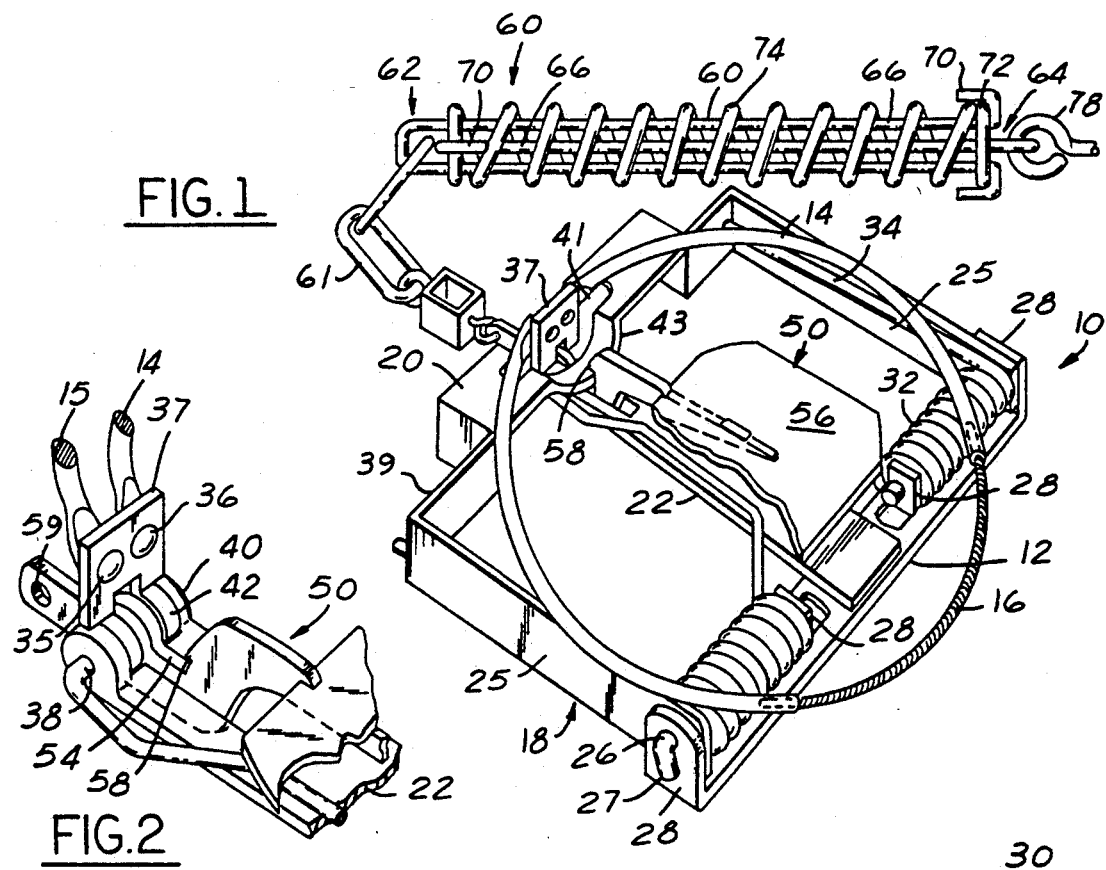
FIG.1
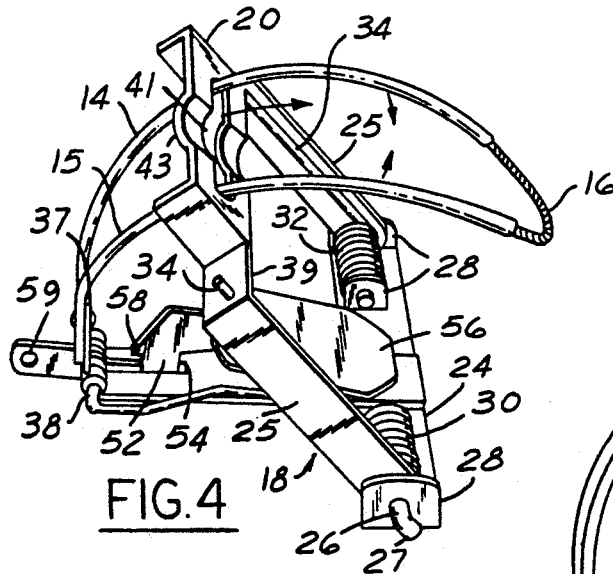
FIG.2
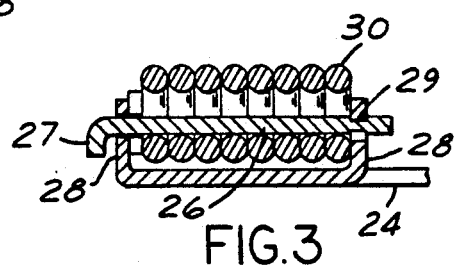
FIG.3
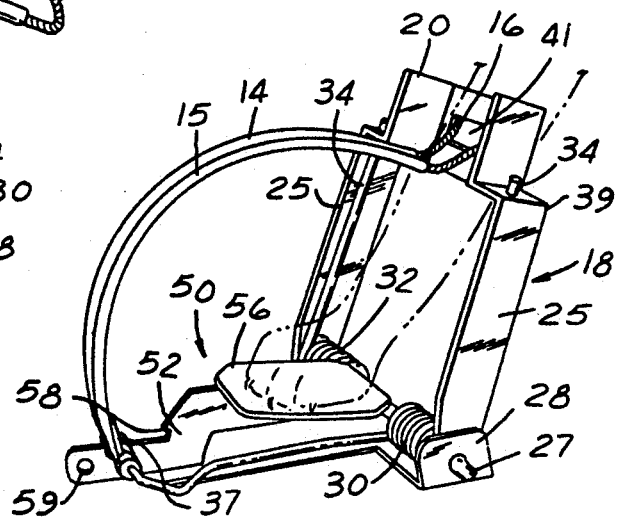
FIG.4
FIG.5

ANIMAL TRAP

This invention relates generally to animal traps and refers more particularly to a snare-type trap designed to catch an animal by the foot or lower leg.

BACKGROUND

At the present time, except for certain live-holding neck and body snares that are very brutal, the only practical traps in use for taking and live-holding major predators, such as coyotes, bobcats and fox, with any degree of consistency are the various versions of what is commonly known as the steel-jawed leghold trap. Traps of this type all have one common characteristic, that is the foot or leg of the animal is caught and gripped between two rigid, parallel steel bars that are held clamped by very powerful springs. When the trap is sprung, the steel jaws strike with great force, causing considerable trauma to the foot or leg which has been caught. The jaws close with such great force that it is not unusual for them to break the animal's foot or leg bones. As the animal fights to free itself, these jaws tend to cut in even deeper, often penetrating to the bone. The foot may become swollen and bloody and sometimes the trap jaws cut off substantially all blood flow, so that in extremely cold weather the foot may freeze.

The so-called Victor Softcatch is a trap designed to eliminate some of this suffering. It is a conventional, coil-spring loaded, steel-jawed trap that has rubber padding added to the jaws. The trap reduces some of the initial trauma and subsequent injury or damage, but an animal held for 12 to 24 hours often will display much of the same swelling and other damage caused by traps without padding.

SUMMARY OF THE INVENTION

The principal object of this invention is to provide a trap which will eliminate most of the trauma and damage or injury caused by conventional traps now in use. In accordance with a preferred embodiment of the invention herein disclosed, a length of flexible cable holds the foot or leg of the animal against a broad-faced, curved surface member under spring tension. The trap closes rapidly, but so gently that it will not cause injury to the animal. In preliminary tests, animals held for as long as 12 hours have shown no foot or leg damage, no swelling, no broken skin and no broken bones. The trap of this invention is thus more humane than any currently available.

Other objects are to provide a trap which may be made in various sizes for trapping a wide variety of animals and birds, to provide a trap which is rugged and dependable, composed of a few simple parts, capable of being inexpensively manufactured and assembled and constitutes an improvement over the traps disclosed in the following U.S. Pat. Nos.:

| | |
|---|---|
| 1,012,386 | H. L. Mainland |
| 2,592,390 | R. E. Burt |
| 3,161,984 | A. M. Martin |
| 4,329,805 | Novak |
| 4,555,863 | Bouffard |
| 4,557,068 | Thomas, et al |
| 4,581,844 | Torkko |
| 4,751,790 | Thomas |

Other objects, features and advantages of the invention will become more apparent as the following description proceeds, especially when considered with the accompanying drawings.

BRIEF DESCRIPTION OF THE DRAWINGS

FIG. 1 is a perspective view of a trap constructed in accordance with the invention.

FIG. 2 is a perspective view of a portion of the trap shown in FIG. 1.

FIG. 3 is a sectional view of one of the coil springs and the pin on which it is mounted.

FIG. 4 is a perspective view showing the trap in an intermediate position after it has been triggered.

FIG. 5 is a perspective view showing the sprung trap clamped on the leg of an animal.

DETAILED DESCRIPTION

Referring now more particularly to the drawings, the animal trap 10 comprises a base 12, a pair of arcuate arms 14 and 15 connected by a flexible cable 16, and a swinging frame 18 having a clamping plate 20 adapted to cooperate with the cable in gripping an extremity, that is, a foot or leg of an animal.

The base 12 is adapted to lie flat on the ground and comprises an elongated central main body portion 22 and a cross-member 24 at the front end of the main body portion extending at right angles thereto.

The swinging frame 18 is generally U-shaped and has a pair of laterally spaced arms 25 pivoted to the cross-member 24 of the base on pins 26 which extend lengthwise of the cross-member. The cross-member of the base has upturned tabs 28 through which the pins 26 extend in aligned relation to one another. Torsion coil springs 30 and 32 mounted on the pins are provided to swing the frame 18 from the set position in FIG. 1 to the sprung position in FIG. 5. One end portion 34 of each spring projects radially outwardly through a hole in the frame 18 to transmit the force of springs 30 and 32 to the frame and swing the frame from the set to the sprung position. The pins 26 are identical and, as seen in FIG. 3, one end 27 is bent and the other end has a reduced neck portion 29 for receiving the inner tab 28 and engaging the hole in the tab as shown in FIG. 3. By pressing laterally on the necked end portion of the pin, it may be easily disengaged from the hole in the tab and removed when and if desired.

The arcuate arms 14 and 15 extend generally lengthwise of the main body portion 22 of the base and have their rear ends pivoted by pivot pins 35 and 36 to a mounting plate 37 Mounting plate 37 is pivoted by pin 38 to the rear end of the main body member 22. The pin 38 is parallel to cross-member 24 and is actually an extension of one end of the coil spring 30. Pin 38 extends through rolled portions 40 of the main body member 22 of the base 12 and likewise through rolled portions 42 of the plate 37. The pivot pins 35 and 36 are parallel to the main body portion 22 of the base and provide a pivotal mounting for the rear ends of the arcuate arms 14 and 15, enabling them to be swung from the open, spaced apart, set position shown in FIG. 1 to a position in which they extend upwardly from the base in a more closely spaced relation as shown in FIGS. 4 and 5.

The cable 16 has its opposite ends permanently secured to the front ends of the arcuate arms 14 and 15. When spread apart in the set position of FIG. 1, the arms 14 and 15 together with the cable 16 assume a generally circular form and are disposed in a plane generally parallel with the base 12 so that when the base is lying flat upon the ground the arms and the cable occupy a generally horizontal plane.

The clamping plate 20 is mounted on the connecting pieces 39 of the swinging frame 18 and has an elongated horizontal slot 41 in the central portion thereof. The clamping plate 20 is a broad-faced member which has a curved or arcuate, concave central portion 43 between the ends of the slot 41. It is this curved central portion which clamps gently against the limb of a trapped animal. When the swinging frame is in the set position shown in FIG. 1, the clamping plate 20 extends down beneath the mounting plate 37 and in fact the plate 37 projects upwardly through the slot 41 as clearly shown in FIG. 1. This slot 41 is, of course, wide enough and long enough to clear both the plate 37 and the arcuate arms 14 and 15.

A trigger mechanism 50 is provided for retaining the swinging frame 18 in the set position and also for releasing the swinging frame when tripped. This trigger mechanism 50 comprises an elongated trigger 52 which is pivoted to the pin 38. The trigger 52 extends through a slot 54 in the main body portion 22 of the base and has a pad 56 above the base in a position in which it is surrounded by the arcuate arms 14 and 15 and cable 16 when the arms are in the spread apart set position shown in FIG. 1. The trigger has a latch 58 which engages over the clamping plate 20 in the set position as shown in FIG. 1 to hold the swinging frame 18 in the set position against the force of springs 30 and 32. The opposite end of the trigger 52, that is the end which extends rearwardly from the pivot pin 38, has a hole 59 adapted to be connected by linkage 61 to an anchor including an extensible spring unit 60 which is staked to the ground to anchor the trap.

The spring unit 60 comprises a pair of elongated U-shaped members 62 and 64 which are of identical shape and construction. Each U-shaped member has a pair of parallel legs 6 with free ends which are returnbent as shown at 70 to provide recesses 72. One of the U-shaped members is turned 90° and reversed end-for-end with respect to the other, and the two are assembled in the manner shown in FIG. 1. A compression coil spring 74 surrounds the two U-shaped members and has one end disposed in the recess 72 of one U-shaped member and the other end disposed in the recess 72 of the other U-shaped member. Linkage 61 from the trigger 52 is connected to the bight of one U-shaped member, and a link 78 is connected to the bight of the other U-shaped member and in turn connected to a stake (not shown) which is adapted to be driven into the ground to anchor the trap. The spring unit 60 is useful in the operation of the trap because when a trapped animal tugs and pulls on the trap in an effort to escape, the spring unit 60 provides a cushion which substantially reduces or largely eliminates any trauma.

In operation, and with the base 12 of the trap flat upon the ground and the arms 14 and 15 spread apart as in Figure 1, if an animal should step into the space surrounded by the arms 14 and 15 and the cable 16 and press upon the pad 56, the trigger will pivot, causing latch 58 to release the swinging frame which will rapidly pivot in an upward direction. FIG. 3 shows the swinging frame 18 in an intermediate position in which the arms 14 and 15 extend within the slot 41 of the clamping plate 20 and the ends of the slot cam the arms upwardly and toward one another. When the swinging frame reaches the sprung position shown in FIG. 5, the leg of an animal which was extended into the trap and was responsible for pressing on the pad 56 and triggering the trap, will be gripped firmly and yet humanely between the cable 16 and the clamping plate 20. The curved or arcuate mid-portion 43 of the clamping plate 20 which engages the animal's leg conforms generally to the shape of the leg so that it will not be damaged or injured when clamped.

What is claimed is:

1. An animal trap comprising a base, a pair of arms extending lengthwise of said base and each having front and rear ends, means pivotally connecting said rear ends of said arms to said base for swinging movement of said arms away from one another to an outer spread-apart position and toward one another to an inner closed position, a flexible linear element extending between and connecting the front ends of said arms, a clamping plate, means mounting said clamping plate on said base for movement between forward and rearward positions, said clamping plate having means engaging said arms and operative during movement of said clamping plate to its forward position to swing said arms toward one another to said inner closed position, spring means urging said clamping plate toward said forward position, a retainer for releasably holding said clamping plate in said rearward position against the force of said spring means, a release member for said retainer disposed in a space bounded by said flexible linear element and said arms when said arms are spread apart, said release member being operative to release said retainer when pressed upon by the extremity of an animal extended into said space permitting said clamping plate to be moved to its forward position by said spring means, said clamping plate when in said forward position cooperating with said flexible linear element in gripping the extremity of an animal extended into said space.

2. The animal trap defined in claim 1, wherein said arms are rigid members.

3. The animal trap defined in claim 2, wherein said clamping plate has a slot adapted to receive said arms and to cam said arms toward one another to said inner closed position thereof during movement of said clamping plate to its forward position.

4. The animal trap defined in claim 1, wherein said arms are rigid members and are arcuately curved so that when spread apart the space defined by said arms and said flexible linear element is generally circular.

5. The animal trap defined in claim 4, wherein said clamping plate has a slot adapted to receive said arms and to cam said arms toward one another to said inner closed position thereof during movement of said clamping plate to its forward position.

6. The animal trap defined in claim 1, wherein said means for mounting said clamping plate on said base comprises a frame, means mounting said frame on said base for forward and rearward swinging about an axis spaced forwardly of said rear ends of said arms, said clamping plate being mounted on said frame adjacent a radially outer end portion thereof.

7. The animal trap defined in claim 6, wherein said arms are rigid and are arcuately curved so that when spread apart the space defined by said arms and said flexible linear element is generally circular, and said clamping plate has a slot adapted to receive said arms and to cam said arms toward one another to said inner closed position thereof as aforesaid during movement of said clamping plate to its forward position.

8. The animal trap defined in claim 7, wherein said means pivotally connecting said rear ends of said arms to said base comprises pivot pins for said respective rear ends of said arms, a plate mounted on said base and to which said pivot pins are secured, said plate and pivot pins projecting through said slot in said clamping plate when said clamping plate is in its rearward position.

9. The animal trap defined in claim 8, wherein said clamping plate has a broad-faced, concave front surface providing a recess for gently gripping the extremity of a trapped animal.

10. The animal trap defined in claim 9, including an anchor having a spring unit to provide a resilient anchorage for said trap.

* * * * *